United States Patent [19]
Park

[11] Patent Number: 6,051,197
[45] Date of Patent: Apr. 18, 2000

[54] METHOD FOR TREATING A WASTE GAS AND AN APPARATUS THEREOF

[75] Inventor: Young-bae Park, Kyonggi-do, Rep. of Korea

[73] Assignee: Union Industry Co., Ltd., Kyonggi-do, Rep. of Korea

[21] Appl. No.: 09/072,419

[22] Filed: May 4, 1998

[30] Foreign Application Priority Data

Oct. 8, 1997 [KR] Rep. of Korea .................. 51478/1997

[51] Int. Cl.[7] .......................... B01D 45/12; B01D 53/38
[52] U.S. Cl. .................. 423/210; 431/5; 423/337; 55/345
[58] Field of Search .................. 423/210, 337; 431/5; 55/345

[56] References Cited

U.S. PATENT DOCUMENTS

| | | | |
|---|---|---|---|
| 3,917,472 | 11/1975 | Berz | 55/349 |
| 4,508,538 | 4/1985 | Leathers et al. | 423/336 |
| 4,886,444 | 12/1989 | Hirase et al. | 431/5 |
| 5,183,646 | 2/1993 | Anderson et al. | 423/210 |
| 5,328,354 | 7/1994 | Mc Grath | 431/5 |
| 5,405,445 | 4/1995 | Kumoda | 423/337 |
| 5,536,298 | 7/1996 | Awagi | 55/329 |
| 5,562,758 | 10/1996 | Awaji | 95/282 |
| 5,735,919 | 4/1998 | Fujii et al. | 55/331 |
| 5,785,929 | 7/1998 | Kim | 422/171 |
| 5,800,792 | 9/1998 | Ibaraki | 423/210 |

*Primary Examiner*—Tom Dunn
*Assistant Examiner*—Peter DiMauro
*Attorney, Agent, or Firm*—Dann, Dorfman, Herrell and Skillman; Henry H. Skillman

[57] ABSTRACT

Disclosed is a method for treating a waste gas and an apparatus thereof capable of reducing the space for establishing the apparatus for treating the waste gas and collecting minute particles formed by oxidizing and cooling the toxic waste gas flown into the apparatus for treating the waste gas through a collecting process without filtering the particles. When treating the waste gas generated in the semiconductor manufacturing process, it is not required to treat a byproduct as in the wet-type treating method and the polymers are collected effectively by means of cyclones separators having different diameters. As a result, as the filtering apparatus is not required excluding the cyclone separators, the cost for establishing the facilities can be reduced.

4 Claims, 6 Drawing Sheets

METHOD FOR TREATING A WASTE GAS AND AN APPARATUS THEREOF

BACKGROUND OF THE INVENTION

1. Field of the Invention

The present invention relates to a method for treating a waste gas and an apparatus thereof, and particularly to a method for treating a waste gas and an apparatus thereof capable of reducing the space for establishing the apparatus for treating the waste gas and collecting minute particles formed by oxidizing and cooling the toxic waste gas flown into the apparatus for treating the waste gas through a collecting process without filtering the particles.

2. Description of the Related Art

Recently, industries in the field of computers, information, electricity, etc. have remarkably developed and made a rapid progress. As the base of the development of those industries, the semiconductor industry has greatly contributed to the industries.

Though the development of the semiconductor industry influences on the overall fields of the industries, the possibility of environmental pollution caused by the toxic waste gas which is generated during the process for manufacturing the semiconductor is also immanent.

Reactive gases used in the process of manufacturing the semiconductor are silane, ammonia, oxidized nitrogen, arsine, diboron, boron, trichloride, etc. The above enumerated reactive gases are toxic gases which can injure fatally even when the workers inhale them by accident or they are contacted to the skin of the workers. Only a little of the toxic gas directly participates in the process of manufacturing the semiconductor. The remaining reactive gases are treated by the apparatus for treating the waste gas and then emitted to the air.

In the case that the toxic reactive gas which is not treated exists in the gas which is emitted to the air, the damage caused by the toxic reactive gas to the environment is hard to say.

Accordingly, it is strictly prescribed environmentally and legally to perfectly treat the toxic components having the waste gas before the gases are emitted to the air. Recently, various apparatuses and methods for treating the waste gas generated during the process of manufacturing the semiconductor have been developed.

The conventional methods for treating the waste gas generated during the process of manufacturing the semiconductor includes a wet-type treating method and a dry-type treating method. The above-identified two methods have following problems.

First, the waste gas wet-type treating method will be explained. The toxic component included in the waste gas flown into the reaction chamber having a predetermined hermetic region is reacted chemically with water supplied to the reaction chamber, and thereby water soluble toxic components are collected in forms of deposits or extracted materials. After that, they are discharged to a drain which is formed at a predetermined region of the reaction chamber. This method has a high efficiency in the aspect of treating the toxic components. However, the reaction chamber and the drain are frequently damaged by an reactive solution which is chemically reacted with the water during the treating process.

Moreover, as the reactive solution which has a minute diameter and is scattered and atomized in the reaction chamber is discharged to the exhaust outlet with the vapored waste gas, an exhaust duct is corroded. As a result, it is possible for the waste gas to be leaked from the exhaust duct.

On the other hand, it is essential to retreat the treated reactive solution not to generate the water pollution, thereby resulting in the increase of the cost for treatment.

Owing to the above described problems, another method for treating the waste gas having a different mechanism which is different from the wet-type treating method is required. As a result, a dry-type treating method is introduced.

In the dry-type treating method, the air and the toxic gas are reacted chemically, and they are separated into a polymer which is a solid particle and a refined gas. Here, only the polymers are precipitated and collected.

The dry-type treating apparatus includes: a mixing unit which mixes the waste gas supplied from the semiconductor manufacturing apparatus with non-active gas such as a nitrogen which acts a role in controlling the rapid explosion and an air for combustion reaction; a combustion chamber which supplies an environment of high temperature so that the combustion reaction can be generated in the mixed gas by receiving the mixed gas from the mixing unit; a precipitating chamber which is connected to the combustion chamber so that the second products which are oxidized in the combustion chamber can be cooled and be precipitated in form of the polymer; a collecting chamber which is connected to the precipitating chamber for collecting the precipitated polymers; and a filtering unit for filtering minute polymers which are not collected from the collecting chamber.

However, as the dry-type treating apparatus can partly be stopped up by the minute particles, it is required to dissemble the apparatus to clean the apparatus, and thereby the cost of the apparatus for treating the waste gas can increases due to the costly filter.

SUMMARY OF THE INVENTION

Therefore, it is an object of the present invention to provide a method for treating a waste gas and an apparatus thereof which is integrated inside of a waste gas treating cabinet having a proper area by reducing the area for establishing the apparatus for treating the waste gas having the simplified structure and process, which enables the waste gas to be emitted in the air without a following process such as a filtering after processes of combustion, cooling, precipitation and collecting of the waste gas generated in manufacturing semiconductor.

According to one aspect of the present invention, a method for treating a waste gas, including steps of: heating the waste gas; collecting separately a polymer and a refined gas including some of the polymer generated in the heated waste gas; and recollecting the polymer from the refined gas by applying the centrifugal force having different magnitudes continuously to the refined gas including some of the polymer which is separated in the collecting step.

Preferably, before heating the waste gas, a step of mixing the waste gas by supplying an air and non-active gas.

Preferably, the step of separately collecting the polymer and the refined gas includes a step of cooling and condensing the polymer and the refined gas including some of the polymer.

Preferably, the step of separately collecting the polymer and the refined gas further includes a step of scraping the polymer which is cooled and condensed and then attached to a predetermined region.

According to another aspect of the present invention, an apparatus for treating a waste gas, including: a waste gas heating unit for mixing and heating the waste gas, non-active gas and reactive air; a first collecting unit for separately collecting a polymer generated in the waste gas heating unit and a refined gas including some of the polymer; a second collecting unit for collecting the polymer from the refined gas by applying the centrifugal force having different magnitudes continuously to the refined gas including some of the polymer which is separated from the first collecting unit; and a negative pressure generating unit for generating a negative pressure lower than the waste gas heating unit, first collecting unit and the second collecting unit.

Preferably, the waste gas heating unit, includes: a manifold for mixing the waste gas, non-active gas and the reactive air; and a heating chamber for generating the polymer and the refined gas including some of the polymer by heating the mixed gas.

Preferably, the first collecting unit includes: a cooling unit for cooling the polymer generated in the waste gas heating unit and the refined gas including some of the polymer; a cylindrical collecting chamber to which the polymer is attached through cooling; a collecting chamber cover which is apart from the collecting chamber and covers up the collecting chamber tightly to guide the refined gas including some of the polymer to the second collecting unit; a scraping unit for scraping the attached polymer; and a retainer for removing the scraped polymer.

Preferably, the cooling unit includes: a cooling water tube cover which has a cylindrical shape and is apart from the collecting chamber by a predetermined distance; and a cooling water tube which is located between the cooling water tube cover and the collecting chamber.

Preferably, the scraping unit includes: a first cylindrical supporting unit which is connected to the lower end of the collecting chamber and having a first friction preventing element formed along the outer wall; a second friction preventing element which is symmetrical to the first friction preventing element and keeps a predetermined distance with said first friction preventing element by a locknut connected to the lower end of the first supporting unit; a gear unit which is inserted rotatably between the first and second friction preventing elements; a second supporting unit which is rotated by being fixed to the gear unit; and a motor which is located at the outer side of the collecting chamber cover and transmits power to the gear unit.

Here, the gear unit includes: a ring-shaped gear body; a gear which is protruded from said bear body and formed in a single body and has gear teeth at its lower surface; and a cover scraper which is fixed to the gear body.

Moreover, the second supporting unit includes: a cylindrical supporting body which is fixed to the gear body; a plurality of supporting bars whose one end is fixed at said supporting body and its other end is connected to a shaft fixing nut; a collecting chamber scraper which is fixed at a first shaft connected to the upper part of the shaft fixing nut with screws; and a retainer scraper which is fixed at a second shaft connected to the lower part of said shaft fixing nut with screws.

Preferably, the cover scraper includes: a scraper for the cooling water tube cover for scraping the polymer which is attached to the outside wall of the cylindrical cooling water tube cover located apart from the collecting chamber so as to surround the collecting chamber; and a scraper for the collecting chamber cover which is fixed apart from/parallel to said scraper for the cooling water tuber cover and scraps the polymer attached to the inside wall of the collecting chamber cover.

Preferably, the first collecting unit further includes a polymer collection box which stores polymers collected through a first exhausting pipe connected to the lower part of said retainer and exhausts the refined gas which passed through a second exhausting pipe connected to the collecting chamber cover to the second collecting unit.

Preferably, the second collecting unit includes: a plurality of cyclone separators which are serially connected so that the diameters of the separators can gradually decrease; and a polymer collection box each connected to the lower part of a plurality of said cyclone separators.

Preferably, the negative pressure generating unit is connected to a final cyclone separator of a plurality of said cyclone separators.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
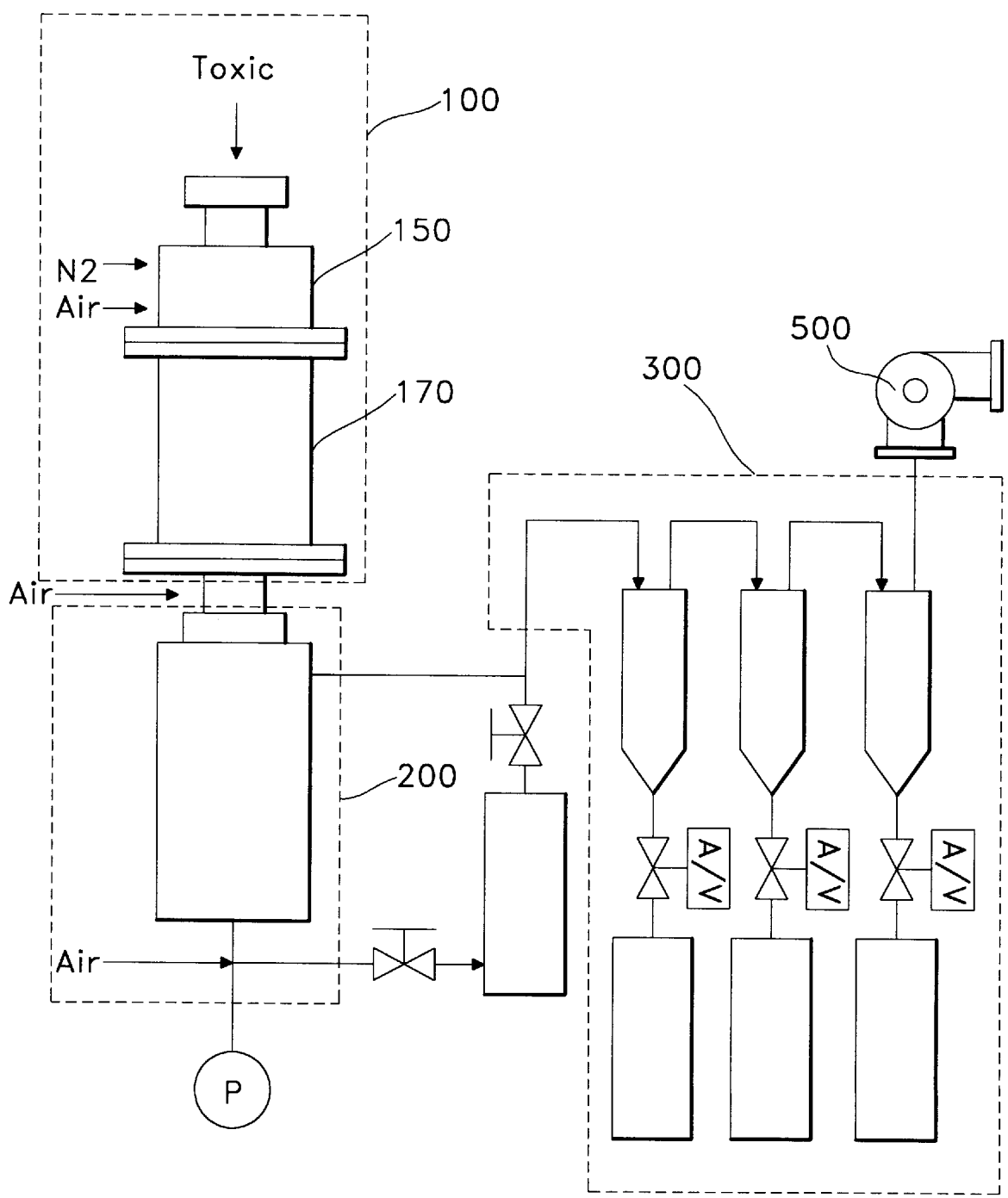
FIG. 1 is a block diagram illustrating an apparatus for treating a waste gas according to the present invention.

The objects, characteristics and advantages of the above-described invention will be more clearly understood through the preferable embodiments referring to the attached drawings.

The method for treating the waste gas and the apparatus thereof will be explained, with reference to the attached drawings.

According to an embodiment of the method for treating the waste gas, a mixed gas is formed by mixing the toxic reactive gas discharged from a semiconductor manufacturing device with a non-active gas such as a nitrogen for controlling the sudden explosion of the toxic reactive gas and an air for oxidization.

After that, the mixed gas is flown into the heated hermetic space, the toxic reactive gas and the air included in the mixed gas are reacted chemically. As a result, the toxic reactive gas is oxidized, and a polymer and a refined gas which are the second products each having a minute particle are formed.

The refined gas and the polymer are induced to a collecting process with a high temperature by the oxidization heat and the heat applied from the outside. In the collecting process, after the refined gas and the polymer at a high temperature are cooled, a plurality of polymers each having a minute particle size are condensed into larger lump, and the larger lump of the polymers are attached to the inner side wall of the collection chamber. After that, the polymer is scraped by the scraper and the refined gas including some of polymer having a minute size is separated.

In other words, in this process, after the polymer becomes large as the polymers each having a minute particle are mutually condensed and fused, the polymer having larger size is attached to the wall side of a predetermined space and removed by the scraper, and thereby the polymers are collected. Moreover, the refined gas including some of the polymer having a minute size is separated.

Even after the collecting process is finished, minute polymers which are not collected are located in the refined gas. Moreover, during the process of scraping the polymers attached to the space wall side by the scraper, minute polymers which are not influenced by the gravity can be generated. Those minute polymers can be flown again into the refined gas and then ventilated. As a result, a process for re-collecting the minute polymers is performed once again after the collecting process.

Two processes are simultaneously performed during the re-collecting process. The first process is to transport the polymers each having a large size which are gathered by the scraper in the direction of the gravity to one place in order to prevent the polymers from being mixed with the refined gas. The second process is to gather separatively the minute polymers in the refined gas.

To gather separately the minute polymers mixed in the refined gas, a method for applying the centrifugal force to the refined gas is used.

Here, when the centrifugal force is generally applied to the gas-solid mixture, as a larger centrifugal force is applied to the solid having a weight larger than the gas, the solid can be separated from the gas-solid mixture. Therefore, the refined gas is firstly separated into the refined gas having the minute polymer and the polymer of a larger size. After that, the polymer is separately received by a separate space.

As described above, as the minute polymers are existent in the refined gas which are firstly separated, the second separating is performed by applying the centrifugal force larger than that of the first separating to the refined gas. The gathering process is performed by repeatedly performing the separating process until the density value of the polymers in the refined gas arrives at an environmental allowance and a legal allowance.

After that, when the density value of the polymers inside of the refined gas arrives at the environmental and legal allowance, the refined gas is emitted to the air through the exhaust duct.

The structure and operation of the apparatus for treating the waste gas for realizing the method for treating the waste gas according to the invention will be illustrated in detail.

As shown in FIG. 1, the apparatus for treating the waste gas according to the present invention includes: a manifold 150 for mixing the toxic gas with the air and the non-active gas; a heating unit 100 having a heating chamber 170 for performing the oxidization reaction of the mixture by heating the mixture flown from the manifold 150; a collecting unit 200 which enables the polymers out of the solid polymer and the refined gas generated from the heating chamber to be cooled and condensed and then attached; a re-collecting unit 300 having a plurality of cyclone mechanisms for selectively separating the minute polymers mixed in the refined gas and collecting the minute polymers; and a blower 500 for generating a negative pressure lower than the atmospheric pressure in the heating unit 100, the collecting unit 200 and the re-collecting unit 300.

All of the above-described compartments are received in a cabinet 400 shown in FIG. 6 which will be illustrated later.

Figure 2:
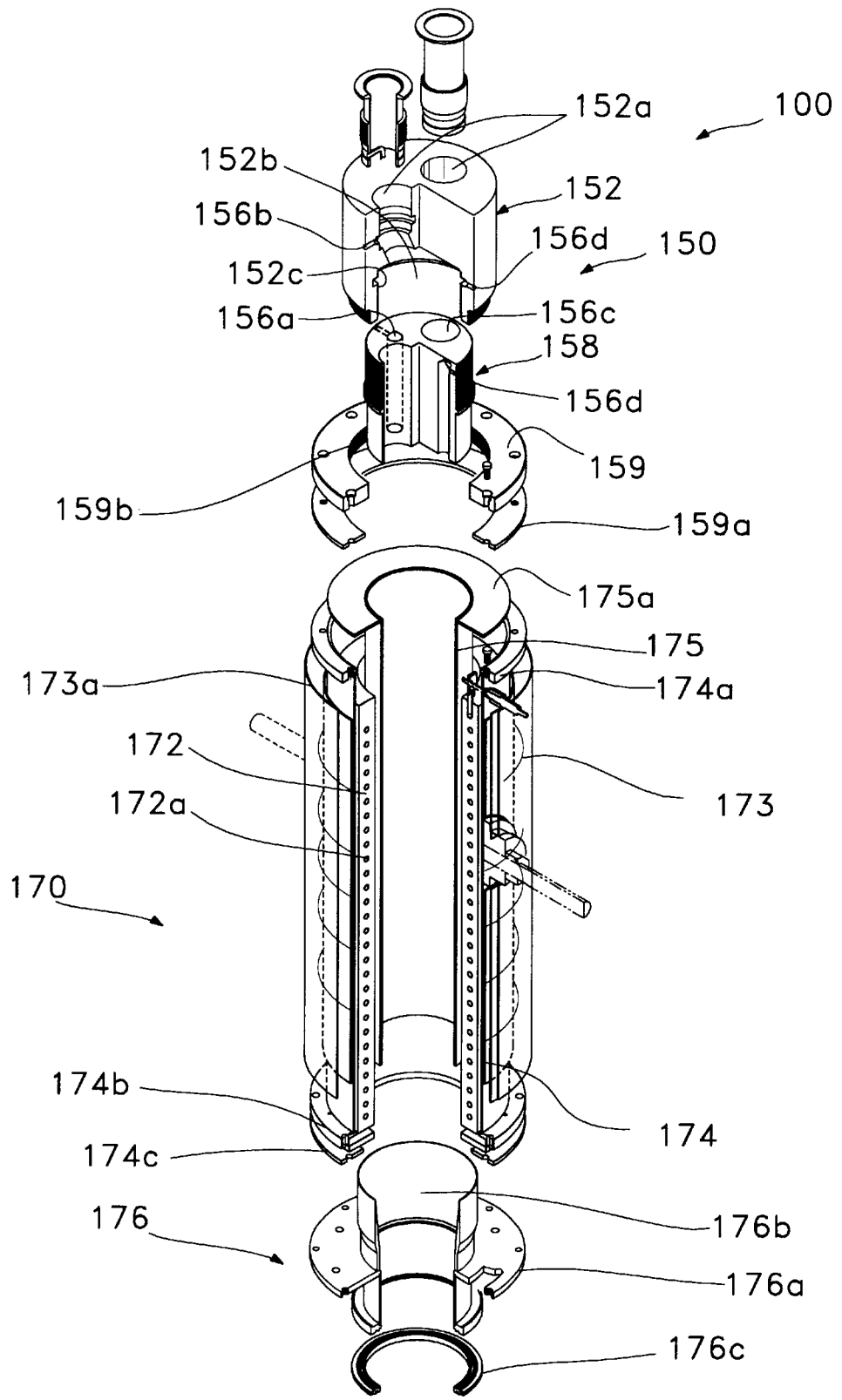
FIG. 2 is a perspective view illustrating a part of a heating unit of FIG. 1 which is partly cut.

FIG. 2 is a perspective view which is partly cut the manifold 150 and the heating chamber 170 of the heating unit 100.

The manifold 150 generally includes: a first inlet head 152 through which the waste gas supplied from the semiconductor manufacturing apparatus is firstly flown; a second inlet head 158 connected to the first inlet head 152; an inlet head flange 159 for fixing the first inlet head 152 and the second inlet head 158; and a gasket 159a enabling the inlet head flange 159 to be connected hermetically to a heating chamber which will be illustrated.

The first inlet head 152 has a cylindrical shape with a predetermined height. Inside of the cylindrical first inlet head, a pair of waste gas inlet holes 152a are formed to penetrate both ends of the first inlet head 152. At the lower end of the first inlet head 152, a recess 152b having a predetermined depth and a diameter smaller than the first inlet head 152 is formed. At the inner surface of the recess 152b, a female screw part is formed. In addition, at the outer surface of the lower end, a male screw part is formed.

At the lateral face of the first inlet head 152, a pair of non-active gas ports 156b are formed facing each other to be communicably connected to the waste gas inlet holes 152a. Moreover, a pair of air supply port 156d facing each other are formed perpendicular to the non-active gas ports 156b. At the second inlet head 158, two pairs of through holes 156a and 156c are formed to penetrate the both ends of the second inlet head 158. The mixed waste gas and the non-active gas passes through the one pair of the through holes 156a from the first inlet head 152, and the air supplied from the air supply port 156d of the first inlet head 152 passes through the other pair of through holes 156c.

At the outer surface of the second inlet head 158, a male screw part is formed, and it is fastened to the female screw part formed at the inner surface of the recess 152b.

At the inner surface of the ring-shaped inlet head flange 159, a female screw part 159b is formed and connected to the male screw part formed at the outer surface of the lower end of the first inlet head 152.

The inlet head flange 159 connected to the first inlet head 152 is to connected to the heating chamber 170. Here, between the inlet head flange 159 and the heating chamber 170, the gasket 159a is located.

The heating chamber 170 includes: an inner tube 175, an outer tube 174, a heater 172 located between the inner tube 175 and the outer tube 174; and a cooling water tube 173 through which the cooling water is flown and enclosing the outer tube 174. At the outer surface of the cooling water tube 173, a cooling water tube cover 173a made of a stainless steel is located facing the outer tube 174 at a predetermined distance.

The outer tube 174 has a cylindrical shape having a predetermined diameter. In the outer tube 174, the inner tube 175 having a diameter smaller than the outer tube 174 is inserted. Around the outer surface of the outer tube 174, the cooling water tube 173 through which the cooling water is flown is wound helically.

At the upper end of the outer tube 174, an outer tube upper flange 174a connected to the inlet head flange 159 is formed. At the lower end of the outer tube 174, an outer tube lower flange 174b is formed so as to be connected to a collecting chamber flange which will be illustrated later.

On the other hand, at the outer tube lower flange 174b, a first connecting flange 176 is hermetically connected by means of a gasket 174c. Here, the first connecting flange 176 includes a cylindrical body 176b which has a diameter capable of being inserted into the outer tube 174 and a ring-shaped flange 176a which is flanged to the outside at the central part of the cylindrical body 176b to along the circumferential surface of the cylinder 176b.

Moreover, a gasket 176c is connected to the lower end of the cylindrical body 176b of the first connecting flange 176 so as to be tightly connected to the collecting chamber flange which will be illustrated later.

The inner tube 175 is inserted into the outer tube 174 having the above-described structure. As the inner tube 175 is inserted in a predetermined position of the outer tube 174, it is preferable to locate an inner tube flange 175a at the upper end of the inner tube 175. Here, the inner tube flange 175a is connected to the outer tube upper flange 174a tightly.

Between the outer tube 174 and the inner tube 175, the heater 172 having a predetermined caloric value is located. The heater 172 has a shape of cylinder made of an insulated material. Inside of the wall side of the heater 172, a hot wire 172a is formed in a preset pattern.

The lower end of the connecting flange 176 which is connected to the outer tube lower flange 174b of the heating chamber 170 is hermetically and communicably connected to the collecting unit 200.

Figure 3:
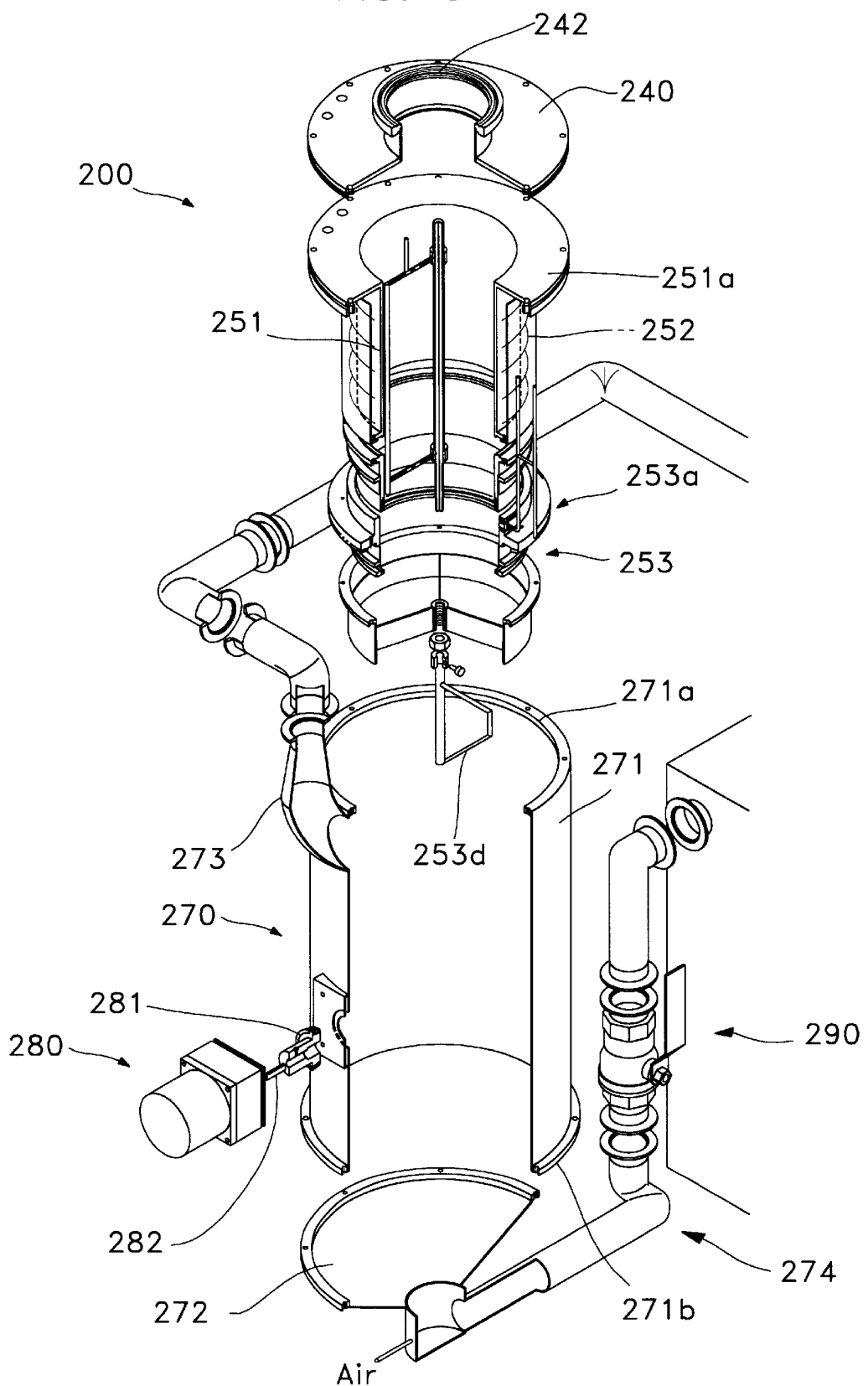
FIG. 3 is a perspective view illustrating a part of a collecting unit of FIG. 1 which is partly cut.

Referring to FIG. 3, the collecting unit 200 includes: a cooling unit for cooling the polymer and the refined gas including some of the polymer generated in the heating chamber 170 to a predetermined temperature; a collecting chamber 251; a collecting chamber cover 270 which is located apart from the collecting chamber 251 to guide the refined gas including some of the polymer to the re-collecting unit 300 and covers up tightly the collecting chamber 251; a scraping unit 253 for scraping the attached polymer; and a retainer 272 for collecting the polymers scraped by the scraping unit 253.

Figure 4:
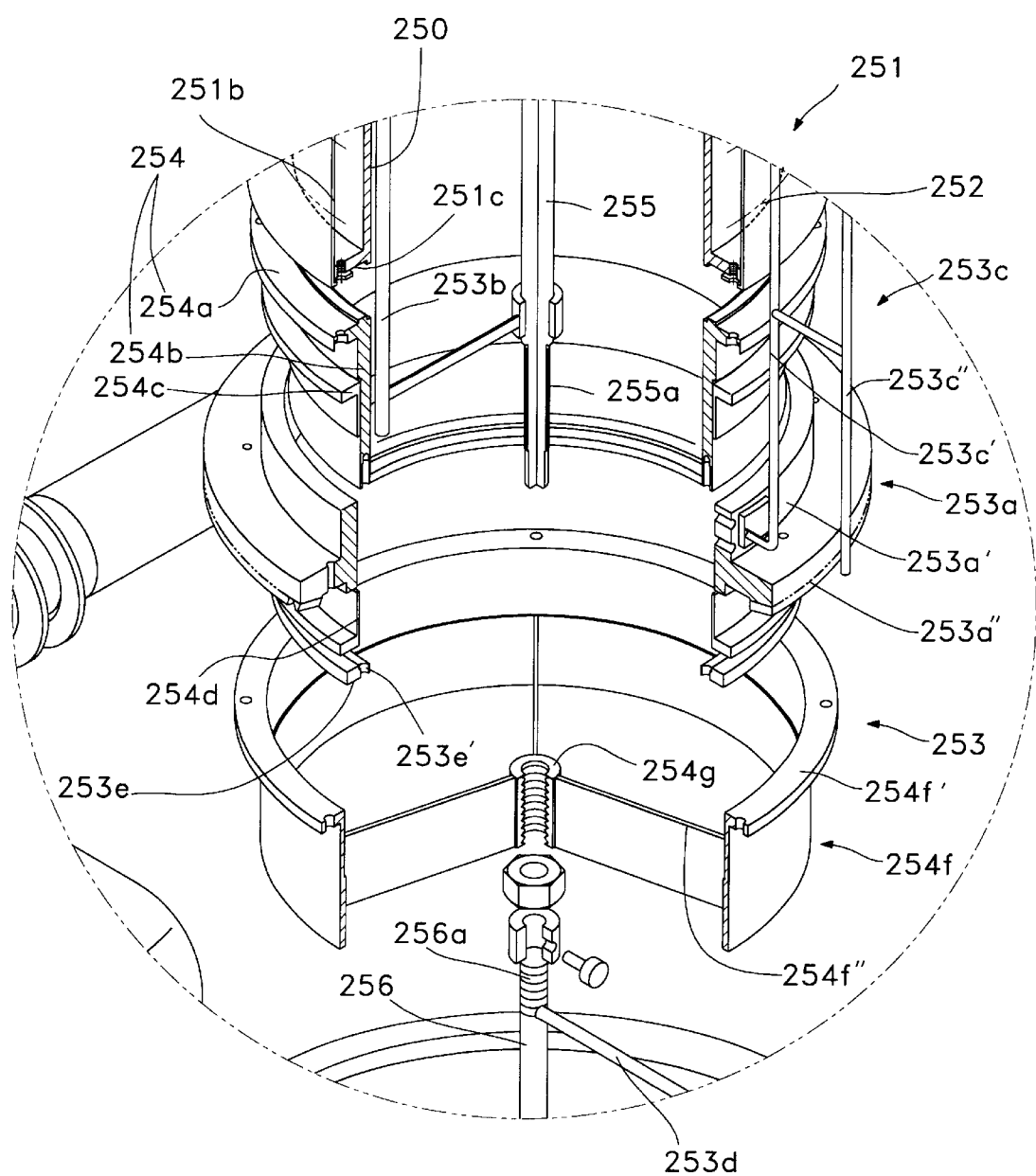
FIG. 4 is a enlarged view of a part of FIG. 3.

Each component is illustrated, referring to the enlarged drawing of FIG. 4.

A upper flange 251a is formed at the upper end of the collecting chamber 251. At the outer surface of the upper flange 251a, a second connecting flange 240 having a gasket groove 242 for connecting hermetically with the first connecting flange 176 is connected.

Moreover, at the outer surface of the lower end of the collecting chamber 251, a lower flange 251c which is protruded at a predetermined height along the outer surface is formed. At the lower flange 251c of the collecting chamber, screw holes with a predetermined interval are formed.

At the outer surface of the collecting chamber 251 having the above-described structure, the cooling unit is established. The cooling unit includes a cooling water tube 252; and a cooling water tube cover 251b.

The cooling water tube 252 is located to enclose the collecting chamber 251 at a predetermined distance having a preset pattern, and the collecting chamber 251 is cooled by the cooling water flowing through the cooling water tube 252.

On the other hand, in the case that the cooling water tube 252 is exposed at the outer surface of the collecting chamber 251, alien substances are gathered between the cooling water tube 252 and the collecting chamber 251, thereby lowering the cooling efficiency by the cooling water.

Accordingly, after the cooling water tube 252 is formed at the outer surface of the collecting chamber 251, a cooling water tube cover 251b made of a thin stainless steel plate surrounds the cooling water tube 252, facing the outer surface of the collecting chamber 251.

At this time, one end of the cooling water tube cover 251b is fixed to the upper flange 251a of the collecting chamber by welding or screws, and the other end is connected to a lower flange 251c of the collecting chamber.

In the case that the polymers which are condensed and attached to the collecting chamber 251 by the cooling unit are not scraped, the pipe can be stopped up. As a result, it is essential to have the device for scraping the attached polymers.

The scraping unit for scraping the attached polymers will be explained in detail.

The scraping unit includes: a first supporting unit 254 which is connected and fixed to the collecting chamber 251; a gear unit 253a which is rotatably connected to the first supporting unit 254; a second supporting unit 254f which is fixed to the gear unit 253a and then rotated; a locknut 253e which is connected to the first supporting unit 254 and rotatably supports the gear unit 253a; a pair of friction preventing units 254c and 254d which minimizes the friction between the gear unit 253a and the first supporting unit 254; and a motor 280 for driving the gear unit 253a.

The first supporting unit 254 has a short cylindrical shape and includes a flange 254a which is bent by 90 degrees to the outside at its one end. Screw holes are formed at the flange 254a in a predetermined interval. The screw holes are similarly formed as the screw holes of the lower flange 252c of the collecting chamber.

After coinciding the screw holes formed at the flange 254a of the first supporting unit 254 and of the lower flange 251c of the collecting chamber, the first supporting unit 254 is fixed and connected to the lower flange 251c of the collecting chamber with screws.

Moreover, at the outer surface of the first supporting unit 254, the first friction preventing unit 254c is formed. The first friction preventing unit 254c is made of Teflon, and it has a cylindrical shape whose inner diameter is inserted into the outer surface of the first supporting unit 254. At the upper end of the first friction preventing unit 254c, a bending part which is bent by 90 degrees to the outside. The gear unit 253a is inserted into the outer surface of the first friction preventing unit 254c.

The gear unit 253a includes: a ring-shaped gear body 253a'; a gear 253a" formed at the gear body 253a'; and a cover scraper 253c formed at the gear body 253a'.

The gear body 253a' has a cylindrical shape whose inner diameter is inserted into the first friction prevention unit 254c. At the outer surface of the gear body 253a', the gear 253a" is protruded at a predetermined length along the outer surface. Along the bottom of the gear 253a", gear teeth are formed, and it has a linear bevel gear which is slanted at a predetermined angle.

Moreover, a cover scraper 253c which is directly connected to the gear body 253a' is provided. The cover scraper 253c includes a scraper 253c' for the cooling water tube cover which scraps the polymer attached to the outer side wall of the cylindrical cooling water tube cover located apart from the collecting chamber 251 to enclose the collecting chamber 251; and a scraper 253c" for the collecting chamber cover which is fixed apart from the scraper 253c' the cooling water tube cover by a predetermined distance and scraps the polymer attached to the inner side wall of the collecting chamber cover 270.

After the gear unit 253a is inserted into the first supporting body 254, in order to prevent the gear unit 253a from being escaped from the first supporting body 254 and to reduce the friction, a second friction preventing unit 254d is inserted between the inner surface of the gear body 253a' and the outer surface of the first supporting body 254.

As the second friction preventing unit 254d is symmetrical to the first friction preventing unit 254c, the escape of the gear body 253a' of the gear unit 253a is prevented and the friction is minimized by the first and second friction prevention units 254c and 254d.

In order to increase the supporting ability of the gear unit 253a, a ring-shaped locknut 253e is located at the bottom of the second friction preventing unit 254d. The locknut 253e has a plurality of screw holes 253e', and the screws connected to the screw holes 253e' are connected to the end of the first supporting body 254 with screws, thereby stably supporting the gear unit 253a.

At the bottom of the gear 253a" of the gear unit 253a, a second supporting unit 254f is fixed with screws. The second supporting unit 254f includes a cylindrical supporting body 254f which is fixed to the gear 253a"; a plurality of supporting bars 254f" whose one end is fixed at the inner diameter of the supporting body 254f' and whose the other end is connected to a shaft fixing nut 254g; a collecting chamber scraper 253b which is fixed at a first shaft 255 connected to the upper part of the shaft fixing nut 254g with screws; and a retainer scraper 253d which is fixed to a second shaft 256 connected to the lower part of the shaft fixing nut 254g with screws. The collecting chamber 251 having the above-described structure is hermetically connected to the collecting chamber cover 270.

The collecting chamber cover body 271 is a cylindrical shape having a predetermined length. At the both ends of the collecting chamber cover body 271, collecting chamber cover flanges 271a and 271b are formed. The collecting chamber cover flange 271a located at the upper end is connected to the collecting chamber flange 240, and the collecting chamber cover flange 271b is connected to a retainer 272 which will be explained later.

The retainer is a hopper shape whose center is connected to a cylindrical polymer collecting pipe 272a having a predetermined length. At the lateral side of the polymer collecting pipe 272a, a polymer exhausting pipe 274 is communicably connected perpendicular to the polymer collecting pipe 272a, and To thereby being connected to a polymer collection box 290.

At the outer surface of the collecting chamber cover body 271, two through holes are formed, which one of them is connected to a gas exhausting pipe 273 and the other is connected to a shaft 282 of a motor 280.

A driving gear 281 is connected to the shaft 282. Here, the driving gear 281 is connected to the gear teeth located at the gear unit 253a. In order to connect the gear teeth of the driving gear 281 to the gear teeth of the gear 253a", the driving gear 281 has reversely inclined gear teeth to the gear teeth of the gear 253a".

The gas exhausting pipe 273 connected to the collecting chamber cover body 271 of the collecting chamber cover 270 is connected in parallel to a polymer exhausting pipe drawn from the polymer collection box 290.

The end of the polymer exhausting pipe 275 is communicably connected to the re-collecting unit 300. The mixed gas including the refined gas and the polymers is flown into a cyclone separator 310 of the re-collecting unit 300 through the polymer exhausting pipe 275 and then separated.

Figure 5:
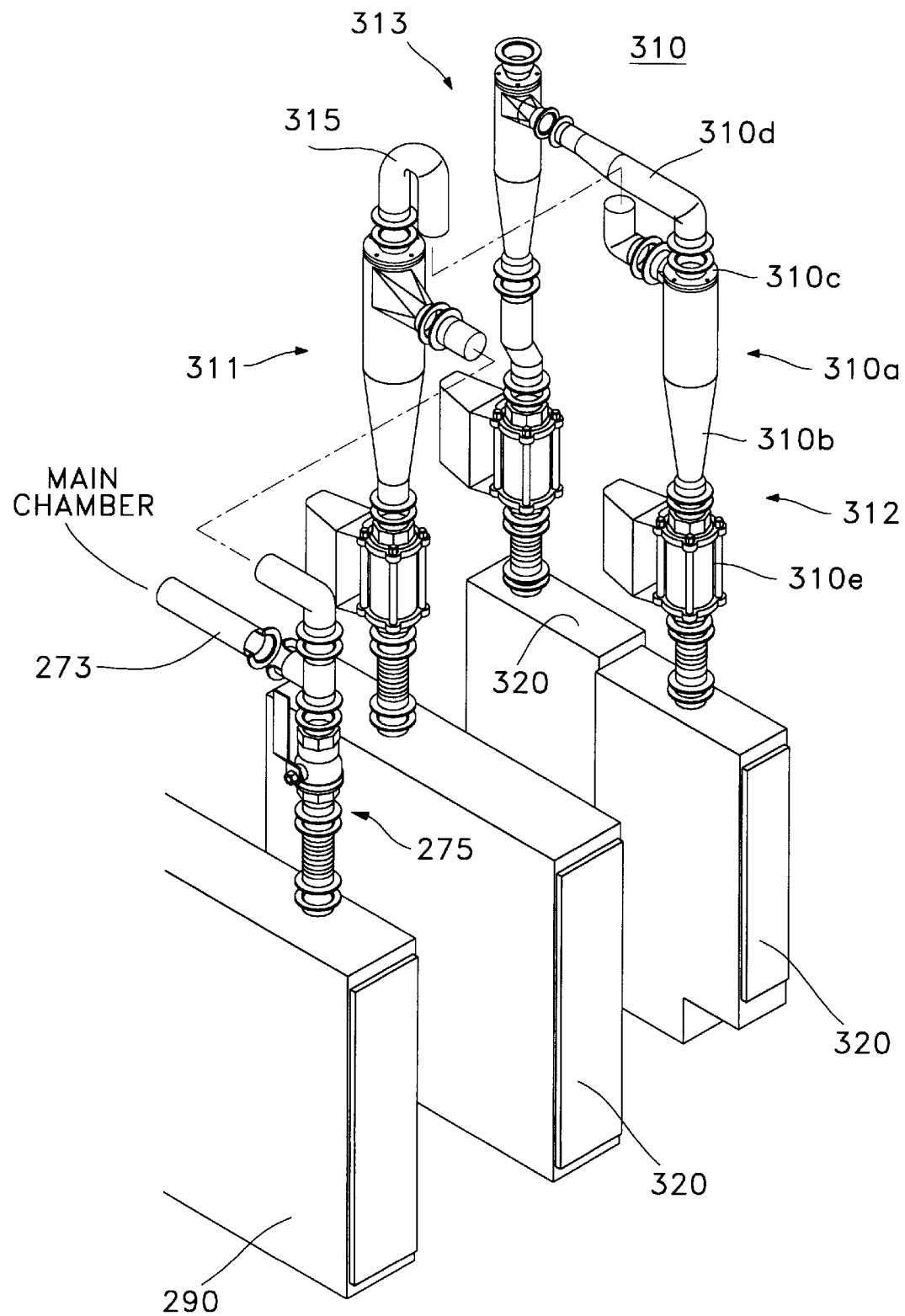
FIG. 5 is an external perspective view illustrating a re-collecting unit of FIG. 4.

The structure of the cyclone separator is illustrated in detail, with reference to FIG. 5.

The multistage cyclone separator 310 is used in the present invention. Preferably, three multistage cyclone separators are used, and they are indicated as a first, second and third cyclone separators 311, 312 and 313.

As shown in the drawing, generally, the first, second and third cyclone separators 311, 312, and 313 each have a cylindrical first main body 310a and a tapered cylindrical second main body 310b which are connected with each other. Here, the upper end of the first main body 310a is sealed tightly by a cap 310c, and the lower end of the second main body 310b is connected to the polymer collection box 320.

Moreover, between the polymer collection box 320 and the first to third cyclone separators 311 to 313, an air valve 310e which is opened/closed by the control signal is preferably formed.

Through the center of the cap 310c, a gas exhausting pipe 310d is formed. A through window for flowing the gas is located at the first main body 310a and the gas exhausting pipe of the former stage cyclone separator is connected to the through window in the direction of tangent to the first main body 310a. Therefore, the mixed gas including the refined gas and the polymer can be rotated along the inner circumferential surface of the first main body 310a.

Here, out of the first to third cyclone separators 311, 312 and 313, the diameter of the first cyclone separator is the largest, and the third cyclone separator 313 is the smallest.

As the diameter of the first cyclone separator 311 which performs the first collection is the largest out of three, a predetermined centrifugal force is generated inside of the first cyclone separator 311.

The centrifugal force operates in the refined gas and the polymer mixed in the refined gas. There are many polymers having large diameters and small diameters. Here, when the same centrifugal force is applied to these polymers, the polymers having larger mass are influenced by the centrifugal force than the polymers having smaller mass.

Accordingly, the polymers having large centrifugal force are rotated along the inner wall of the first cyclone separator 311 and gradually moved in the direction of the gravity, and thereby they are flown into the polymer collection box 320.

In the case of the polymers having smaller mass, as they are not influenced greatly by the centrifugal force, they are moved only to the lower part of the inside of the first cyclone separator 311. However, they cannot enter the polymer collection box 320.

It is because that the refined gas is sucked up when the negative pressure is formed at a gas exhausting pipe 310a which is connected to the cap 310c by a blower, in the case that the bottom of the first cyclone separator 311 is blocked by the polymer collection box 320.

Accordingly, when the diameter of the polymer is smaller than the centrifugal force applied in the first cyclone separator 311, the polymers are not collected in the polymer collection box 320 and they are flown backward, i.e., in the opposite direction of gravity, thereby being flown to the inside of the through window of the second cyclone separator 312 through the gas exhausting pipe 310d.

The mixed gas flown into the second cyclone separator 312 is influenced by the centrifugal force larger than in the first cyclone separator 311. As a result, polymers having diameters smaller than the polymers collected in the first cyclone separator 311 are collected in the second cyclone separator 312.

Most of the polymers are collected in the second cyclone separator 312. However, as a small amount of polymer is in the refined gas, the refined gas is flown into a third cyclone separator 313 performing the final collection from the second cyclone separator 312.

At this time, as the third cyclone separator 313 has a diameter smaller than the second cyclone separator 312, the refined gas and the polymer included in the refined gas are influenced by the centrifugal force larger than in the second cyclone separator 312, and thereby even polymers having the slightest mass cannot escape from the third cyclone separator 313 and they are collected. That is why the diameters of the first, second and third cyclone separators are gradually reduced.

The operation of the apparatus for treating the waste gas having the above-identified structure is illustrated, with reference to the attached drawings.

First, the waste gas generated in the semiconductor manufacturing apparatus is mixed and flown to the heating chamber 170 through the first inlet head 152 and the second inlet head 158 of the manifold 150 together with the air and nitrogen.

At this time, the mixed gas including the waste gas, nitrogen and oxygen flown into the heating chamber 170 passes the heater 172 of the heating chamber 170 which is the region with a high temperature. When passing the heater 172, the waste gas capable of easily oxidizing is chemically reacted with the oxygen and it is changed to the second product, which is the minute solid particle. Here, the nitrogen functions to make an environment for preventing explosion caused by the reaction of the waste gas and the oxygen.

The waste gas which is changed to the second product is flown to the collecting chamber 250 from the heating chamber 170.

When the second product arrives at the collecting chamber 250 where the region of low temperature is formed by a cooling water tube 252, the second product is cooled and condensed, thereby being reconfigured as a large second product particle, which is the polymer. The polymer is attached to the inner side wall of the collecting chamber 250 having a comparatively low temperature, and the attached polymers each in a solid state are removed from the inner side wall by the scrapers and they are separately received.

Moreover, as the size of the polymers in the shape of the solid lump becomes very large, the polymers are influenced by the gravity. As a result, one part of the polymers is gradually moved to the lower part of the collecting chamber, and the other part of the polymers which is mixed with the refined waste gas floats without being influenced by the gravity, as the size of the particle is small.

As described above, the polymers having different size of particles are processed through the two paths. In other words, the polymers having larger particles are transported downwardly by the gravity and then moved to the polymer collection box 320 through the retainer 272 of the collecting chamber cover 270.

On the other hand, the polymers having smaller particles are mixed with the refined gas and then exhausted through the gas exhausting pipe 273 formed at the collecting chamber cover 270. After that, the polymers having smaller particles pass through the first to third cyclone separator 311 to 313 having different diameters, and the polymers included in the refined gas are separated once again, and thereby being moved to the polymer collection box 320.

Figure 6:
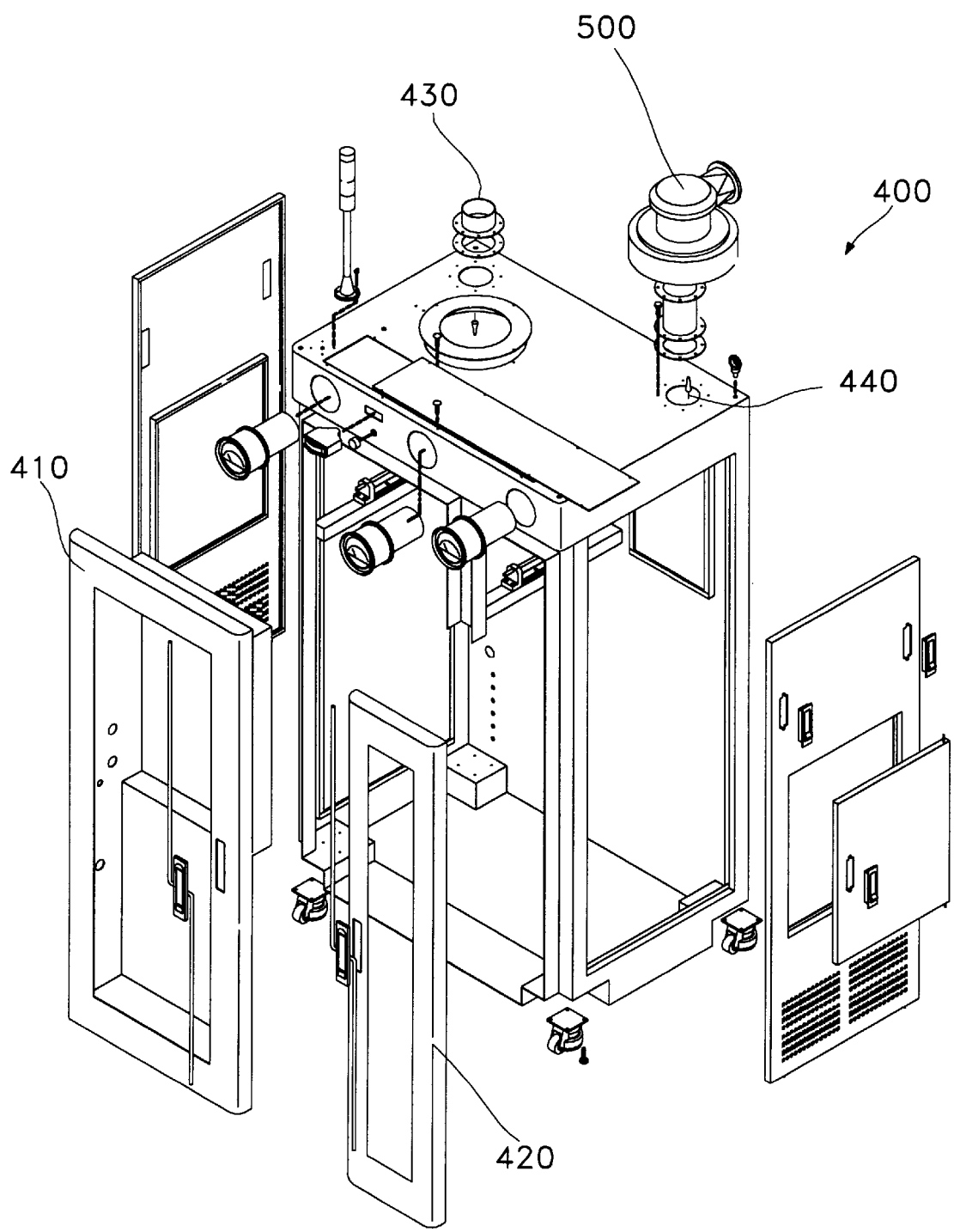
FIG. 6 is a perspective view illustrating a cabinet for receiving the apparatus for treating the waste gas according to the present invention.

As illustrated in FIG. 6, according to the present invention, the waste gas exhausted from the semiconductor manufacturing apparatus is processed to reduce the environmental pollution. Moreover, to reduce the space for setting up the apparatus for treating the waste gas, all the apparatus required for the apparatus for treating the waste gas are established in one cabinet.

At the front side of the cabinet 400, previously known double doors 410 and 420 are formed. Control panels are formed at the double doors 410 and 420 for controlling the process. At the upper part of the cabinet 400, there are a waste gas inlet pipe 430 through which the waste gas is flown and a fixing hole 440 in which a blower 500 is fixed so that the treated refined gas can be exhausted. All the apparatuses for treating the waste gas are located so as to be received in the cabinet.

As described above, when treating the waste gas generated in the semiconductor manufacturing process, it is not required to treat a byproduct as in the wet-type treating method and the polymers are collected effectively by means of cyclones separators having different diameters. As a result, as the filtering apparatus is not required excluding the cyclone separators, the cost for establishing the facilities can be reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A method for treating a waste gas, comprising the steps of:
   heating the waste gas in the presence of air to generate a particulate polymer and a refined gas;
   separating and collecting separately one portion of the generated polymer and the refined gas including the remaining portion of the polymer generated in said heated waste gas; and
   collecting said remaining polymer from said refined gas by applying centrifugal forces having different magnitude continuously to the refined gas including the remaining polymer which is separated in said separating-and-collecting step,
   said step of applying centrifugal forces having different magnitude comprises providing a plurality of at least three cyclone separators connected in series and having decreasing diameters respectively applying progressively greater centrifugal forces to the refined gas including the remaining polymer after separating one portion of the generated polymer, whereby particles which are not removed by the centrifugal force in one of said serially connected cyclone separators is subjected to a higher centrifugal force in the succeeding one of said at least three serially-connected cyclone separator.

2. The method of claim 1, further comprising a step of supplying an air and non-active gas to the waste gas, and mixing the air and non-active gas and the waste gas before heating said waste gas.

3. The method of claim 1, wherein said step of separating and collecting said one portion of the polymer and the refined gas comprises a step of cooling and condensing the polymer and the refined gas including the remaining polymer.

4. The method of claim 3, wherein said step of separating and collecting the polymer and the refined gas further comprises a step of causing said one portion of the cooled and condensed polymer to attach to a predetermined region, and a step of scraping the polymer which is attached to the predetermined region to separate said one portion of the polymer from the refined gas including the remaining portion of the polymer.

* * * * *